(12) United States Patent
Murao

(10) Patent No.: US 10,044,950 B2
(45) Date of Patent: Aug. 7, 2018

(54) IMAGE PICKUP DEVICE

(71) Applicant: Renesas Electronics Corporation, Tokyo (JP)

(72) Inventor: Fumihide Murao, Tokyo (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 0 days.

(21) Appl. No.: 15/650,170

(22) Filed: Jul. 14, 2017

(65) Prior Publication Data
US 2018/0063450 A1    Mar. 1, 2018

(30) Foreign Application Priority Data

Sep. 1, 2016  (JP) ................................. 2016-170500

(51) Int. Cl.
| | |
|---|---|
| *H04N 3/14* | (2006.01) |
| *H04N 5/335* | (2011.01) |
| *H04N 9/64* | (2006.01) |
| *H04N 5/217* | (2011.01) |
| *H04N 5/355* | (2011.01) |
| *H04N 5/3745* | (2011.01) |
| *H04N 5/378* | (2011.01) |
| *H04N 5/343* | (2011.01) |
| *H04N 5/232* | (2006.01) |

(52) U.S. Cl.
CPC ............. *H04N 5/355* (2013.01); *H04N 5/378* (2013.01); *H04N 5/37455* (2013.01); *H04N 5/23277* (2013.01); *H04N 5/343* (2013.01)

(58) Field of Classification Search
CPC .. H04N 5/378; H04N 5/37457; H04N 5/3745; H01L 27/14609; H01L 27/14641
See application file for complete search history.

(56) References Cited

U.S. PATENT DOCUMENTS

| | | | |
|---|---|---|---|
| 7,460,164 B2 | 12/2008 | Hyama et al. | |
| 9,699,395 B1 * | 7/2017 | Boemler | ............. H04N 5/3575 |
| 2002/0134918 A1 * | 9/2002 | Miida | ................. H03G 3/3084 |
| | | | 250/214.1 |

(Continued)

FOREIGN PATENT DOCUMENTS

JP    2005-217771 A    8/2005

*Primary Examiner* — Chia-Wei A Chen
(74) *Attorney, Agent, or Firm* — Sughrue Mion, PLLC

(57) ABSTRACT

In a related-art image pickup device, there is a problem that the power consumption increases. A semiconductor device includes a plurality of pixel circuits connected to one vertical signal line SL, and an inverting amplification circuit configured to amplify a signal level obtained through the vertical signal line SL with an amplification factor determined according to a capacitance ratio between an input capacitor Ci and a feedback capacitor Cf, in which the feedback capacitor Cf is disconnected from an output of the inverting amplification circuit and connected to the vertical signal line SL in a charge recovery period set in a period between a first timing and a second timing, the first timing being a timing when amplification of an image pickup signal read from a first pixel circuit by the inverting amplification circuit has been completed, the second timing being a timing when amplification of a dark level signal read from a second pixel circuit by the inverting amplification circuit is started.

9 Claims, 17 Drawing Sheets

(56) References Cited

U.S. PATENT DOCUMENTS

| | | | | |
|---|---|---|---|---|
| 2008/0211951 | A1* | 9/2008 | Wakabayashi | H04N 5/3655 |
| | | | | 348/308 |
| 2008/0303705 | A1* | 12/2008 | Sakakibara | H03M 1/0658 |
| | | | | 341/172 |
| 2010/0065720 | A1* | 3/2010 | Raynor | H03F 3/087 |
| | | | | 250/201.1 |
| 2012/0242878 | A1* | 9/2012 | Yoshida | H03M 1/162 |
| | | | | 348/300 |
| 2014/0028883 | A1* | 1/2014 | Shin | H04N 13/0271 |
| | | | | 348/297 |
| 2017/0013221 | A1* | 1/2017 | Yanagida | H01L 27/307 |
| 2017/0046551 | A1* | 2/2017 | Lee | G06K 9/0002 |
| 2017/0046555 | A1* | 2/2017 | Lee | G06K 9/0002 |
| 2017/0353683 | A1* | 12/2017 | Sakakibara | H04N 5/374 |

* cited by examiner

IMAGE PICKUP DEVICE

CROSS-REFERENCE TO RELATED APPLICATIONS

This application is based upon and claims the benefit of priority from Japanese patent application No. 2016-170500, filed on Sep. 1, 2016, the disclosure of which is incorporated herein in its entirety by reference.

BACKGROUND

The present disclosure relates to an image pickup device, and for example to an image pickup device that amplifies a signal level read through a vertical signal line by using an inverting amplifier and performs an analog-to-digital conversion process for the amplified signal level.

Japanese Unexamined Patent Application Publication No. 2005-217771 discloses an example of a circuit configuration of an image pickup device. The circuit configuration disclosed in Japanese Unexamined Patent Application Publication No. 2005-217771 includes a plurality of pixels for taking an image of a subject, a plurality of vertical output lines for reading signals from the plurality of pixels, and an amplification circuit for amplifying the signals read into the plurality of vertical output lines.

SUMMARY

In the image pickup device disclosed in Japanese Unexamined Patent Application Publication No. 2005-217771, signals read from pixels are amplified by using the inverting amplifier. Further, in the image pickup device disclosed in Japanese Unexamined Patent Application Publication No. 2005-217771, a dark-level readout process in which a dark level of a pixel is amplified is performed before a signal level read from the pixel is amplified. Therefore, in the image pickup device, the dark-level readout process and the pixel signal amplification process are repeatedly performed for each pixel. That is, in the image pickup device, charging and discharging of the inverting amplifier are repeated for each pixel. It should be noted that the number of pixels in an image pickup device and its frame rate are significantly increasing in recent years. Therefore, in the image pickup device, the frequency of the charging and discharging (i.e., how often the charging and discharging are performed) for a feedback capacitance of the above-described inverting amplifier is increasing. As a result, there is a problem that the power consumption increases as the performance of the image pickup device improves.

Other objects and novel features will be more apparent from the following description in the specification and the accompanying drawings.

According to one embodiment, a semiconductor device includes: a plurality of pixel circuits connected to one vertical signal line; and an inverting amplification circuit configured to amplify a signal level obtained through the vertical signal line with an amplification factor determined according to a capacitance ratio between an input capacity and a feedback capacity, in which the feedback capacity is disconnected from an output of the inverting amplification circuit and connected to the vertical signal line in a charge recovery period set in a period between a first timing and a second timing, the first timing being a timing when amplification of an image pickup signal read from a first pixel circuit by the inverting amplification circuit has been completed, the second timing being a timing when amplification of a dark level signal read from a second pixel circuit by the inverting amplification circuit is started.

According to the above-described embodiment, the semiconductor device can reduce the electric power consumed by the reading of pixel signals.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

For clarifying the explanation, the following descriptions and the drawings may be partially omitted and simplified as appropriate. Further, the same symbols are assigned to the same components throughout the drawings and duplicated explanations are omitted as required.

Figure 1:
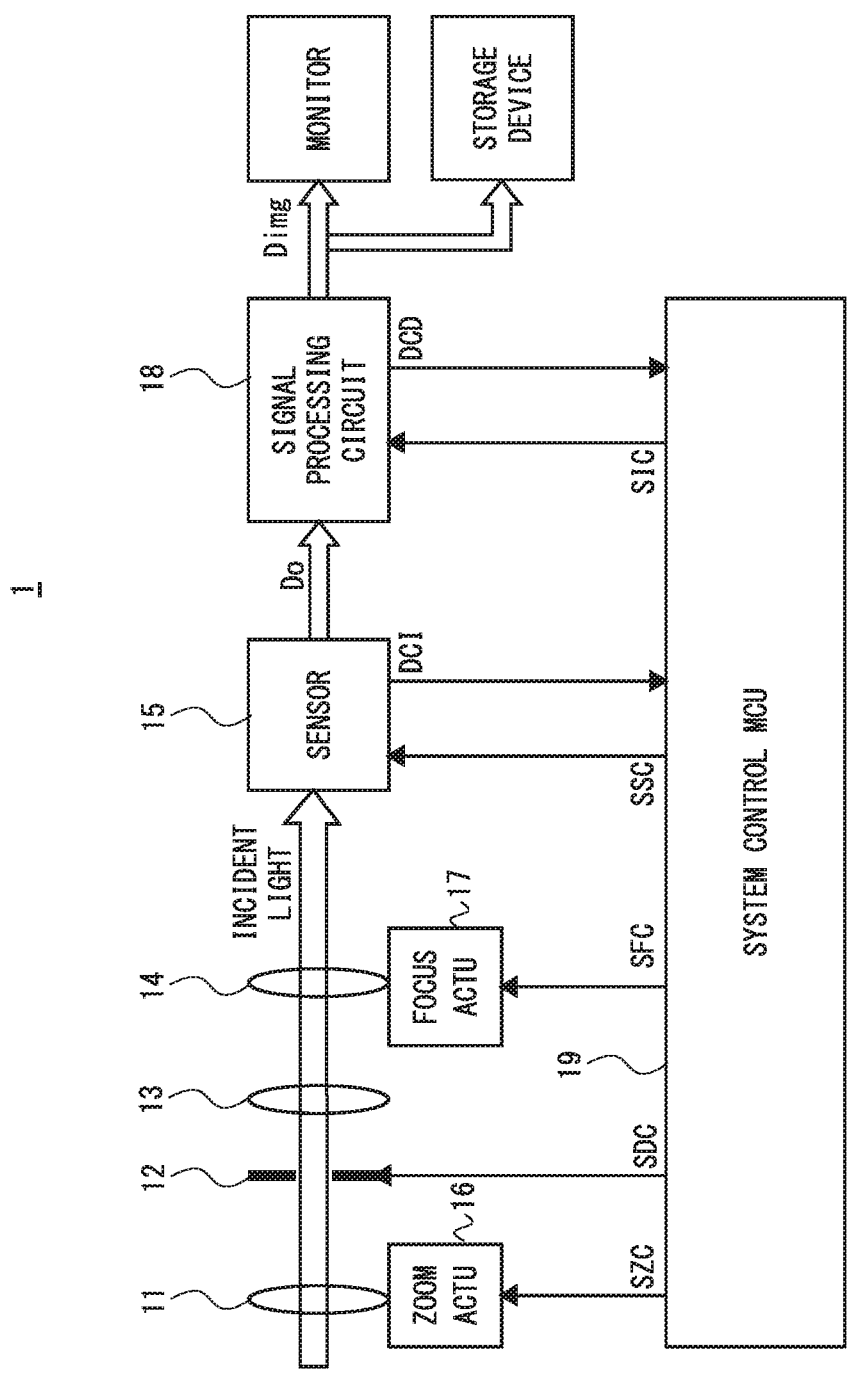
FIG. 1 is a block diagram of a camera system including an image pickup device according to a first embodiment.

FIG. 1 shows a block diagram of a camera system 1 according to a first embodiment. As shown in FIG. 1, the camera system 1 includes a zoom lens 11, a diaphragm mechanism (or an aperture mechanism) 12, a fixed lens 13, a focus lens 14, an image pickup device 15, a zoom lens actuator 16, a focus lens actuator 17, a signal processing circuit 18, a system control MCU 19, a monitor, and a storage device. Note that the monitor and the storage device are used to check and store images taken by the camera system 1, and they may be disposed in another system separately provided from the camera system 1.

The zoom lens 11, the diaphragm mechanism 12, the fixed lens 13, and the focus lens 14 form a group of lenses (hereinafter referred to as a "lens group") of the camera system 1. The position of the zoom lens 11 is changed by the zoom lens actuator 16. The position of the focus lens 14 is changed by the focus lens actuator 17. Further, in the camera system 1, a zooming magnification and a focus are changed by moving lenses by using various actuators and the amount of incident light is changed by operating the diaphragm mechanism 12.

The zoom lens actuator 16 moves the zoom lens 11 based on a zoom control signal SZC output by the system control MCU 19. The focus lens actuator 17 moves the focus lens 14 based on a focus control signal SFC output by the system control MCU 19. The diaphragm mechanism 12 adjusts the aperture level according to a diaphragm control signal SDC output by the system control MCU 19.

The image pickup device 15, which includes, for example, light-receiving elements such photodiodes, converts light-receiving pixel information obtained from these light-receiving elements into digital values and outputs them as image information Do. Further, the image pickup device 15 analyzes the image information Do, which the image pickup device 15 outputs as described above, and outputs image feature information DCI representing a feature(s) of the image information Do. This image feature information DCI includes two images acquired by an autofocus process (which is described later). Further, the image pickup device 15 performs gain control for each pixel of the image information Do, exposure control for the image information Do, and HDR (High Dynamic Range) control for the image information Do based on a sensor control signal SSC supplied from the system control MCU 19. Details of the image pickup device 15 are described later.

The signal processing circuit 18 performs image processing such as an image correction process for the image information Do received from the image pickup device 15 and outputs the resultant data as image data Dimg. The signal processing circuit 18 analyzes the received image information Do and outputs color-space information DCD. The color-space information DCD includes, for example, brightness information and color information of the image information Do.

The system control MCU 19 controls the focus of the lens group based on the image feature information DCI output from the image pickup device 15. More specifically, the system control MCU 19 controls the focus of the lens group by outputting a focus control signal SFC to the focus lens actuator 17. The system control MCU 19 adjusts the aperture level of the diaphragm mechanism 12 by outputting a diaphragm control signal SDC to the diaphragm mechanism 12. Further, the system control MCU 19 generates a zoom control signal SZC according to an externally-supplied zoom instruction and controls the zooming magnification of the lens group by outputting the zoom control signal SZC to the zoom lens actuator 16.

More specifically, the focus is shifted by moving the zoom lens 11 by using the zoom lens actuator 16. Therefore, the system control MCU 19 calculates a positional phase difference between two images of an object based on two images included in the image feature information DCI obtained from the image pickup device 15 and calculates the amount of defocus (hereinafter referred to as a "defocus amount") of the lens group based on this positional phase difference. The system control MCU 19 automatically obtains a correct focus according to this defocus amount. The above-described process is the autofocus process.

Further, the system control MCU 19 calculates an exposure control value indicating an exposure setting of the image pickup device 15 based on the brightness information included in the color-space information DCD output from the signal processing circuit 18 and controls the exposure setting and a gain setting of the image pickup device 15 so that the brightness information included in the color-space information DCD output from the signal processing circuit 18 gets closer to the exposure control value. Note that the system control MCU 19 may also calculate a control value for the diaphragm mechanism 12 when it changes the exposure.

Further, the system control MCU 19 outputs a color-space control signal SIC for adjusting the brightness or the color of the image data Dimg based on an instruction provided by a user. Note that the system control MCU 19 generates the color-space control signal SIC based on a difference between the color-space information DCD acquired from the signal processing circuit 18 and information provided by the user.

One of the features of the camera system 1 according to the first embodiment lies in its control method performed when pixel information is read from the photodiodes in the sensor 15 (i.e., in the image pickup device 15). Therefore, the image pickup device 15 is explained hereinafter in a more detailed manner.

Figure 2:
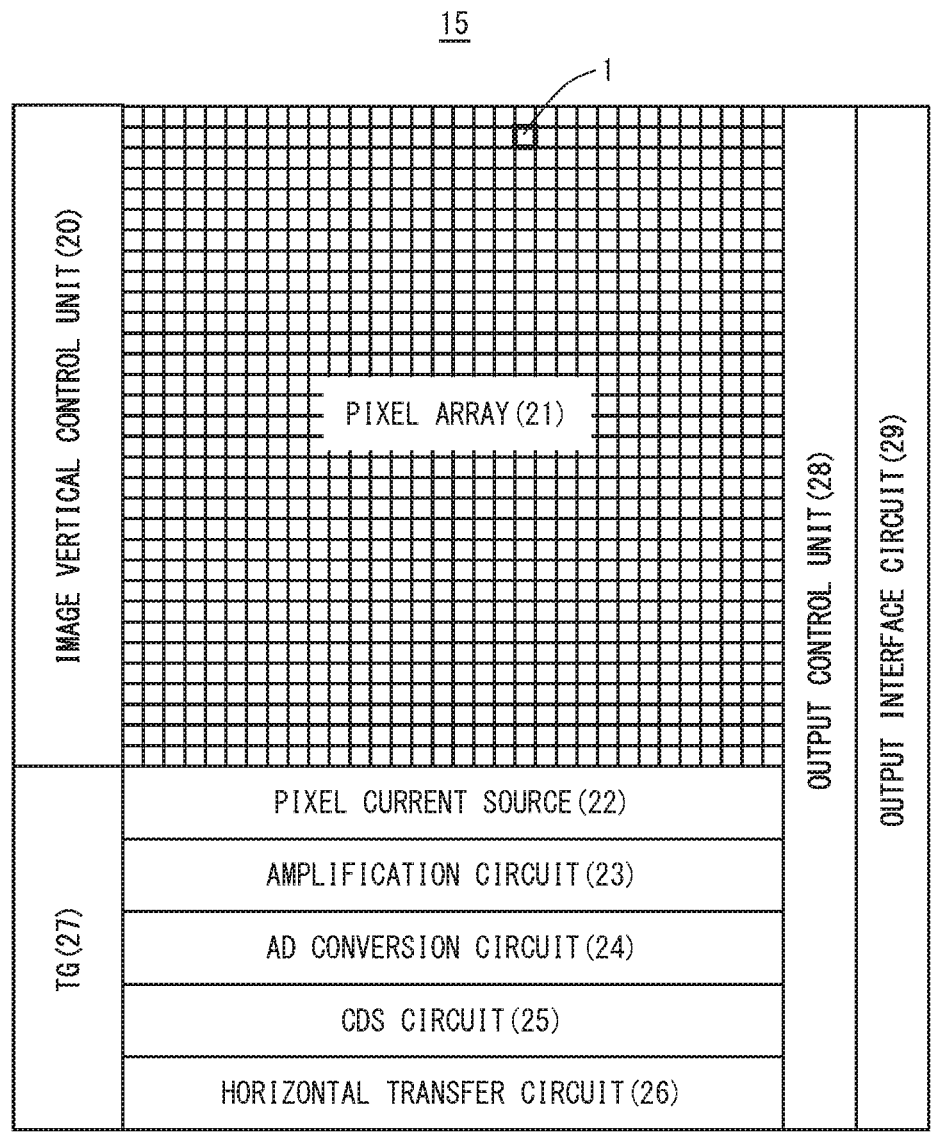
FIG. 2 is a schematic diagram of a floor layout of the image pickup device according to the first embodiment.

FIG. 2 shows a schematic diagram of a part of a floor layout of the image pickup device according to the first embodiment. In particular, FIG. 2 shows a part of a floor layout of the image pickup device 15 which includes an image vertical control unit 20, a pixel array 21, a pixel current source 22, an amplification circuit 23, an AD (Analog to Digital) conversion circuit 24, a CDS (Correlated Double Sampling) circuit 25, a horizontal transfer circuit 26, a timing generator 27, an output control unit 28, and an output interface 29.

The image vertical control unit 20 controls operations of pixel circuits arranged in a lattice pattern in the pixel array 21 on a row-by-row basis. The pixel current source 22 includes a current source provided for each column of the pixel circuits arranged in the pixel array 21. The amplification circuit 23 adjusts a gain for pixel information read from the pixel circuits. The AD conversion circuit 24 converts the pixel information, for which the gain has been adjusted by the amplification circuit 23, into digital values. The CDS circuit 25 removes noises from the pixel information by subtracting a reset level (hereinafter referred to as a "dark level") from the signal level of the pixel information. The horizontal transfer circuit 26 successively transfers the pixel information, from which noises have been removed by the CDS circuit 25, to the output control unit 28 in the order starting from pixel information located closer to the output control unit 28. The timing generator 27 controls timings at which the image vertical control unit 20, the pixel current source 22, the amplification circuit 23, the AD conversion circuit 24, and the CDS circuit 25 operate. The output control unit 28 outputs the pixel information transferred by the horizontal transfer circuit 26 to the output interface 29. The output interface 29 is an output interface circuit of the image pickup device 15.

Figure 3:
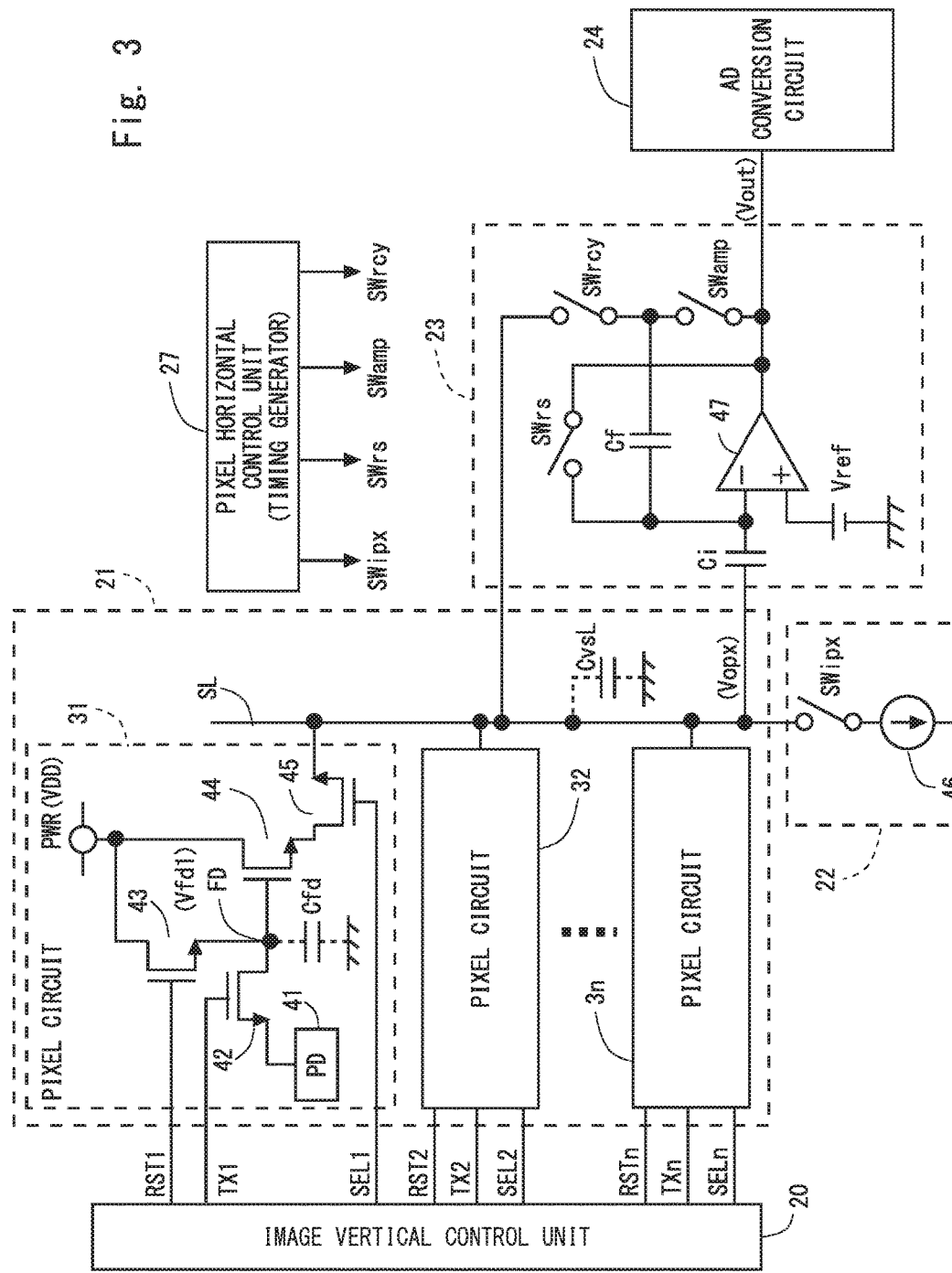
FIG. 3 is a circuit diagram of pixel circuits, a pixel current source, and an amplification circuit of the image pickup device according to the first embodiment.

One of the features of the image pickup device according to the first embodiment lies in the amplification circuit 23. Therefore, the amplification circuit 23 is explained hereinafter in detail. FIG. 3 shows a circuit diagram of the diaphragm mechanism 12, the pixel current source 22, and the amplification circuit 23 according to the first embodiment. Note that FIG. 3 shows the image vertical control unit 20 and an image horizontal control unit (e.g., the timing generator 27) in order to explain control signals supplied to each element of the pixel circuit and control signals supplied to the pixel current source 22 and the amplification circuit 23. Further, FIG. 3 shows only a part of the circuit related to one pixel column. In FIG. 3, parenthesized symbols indicate voltages that are used in the following explanation.

As shown in FIG. 3, the pixel array 21 according to the first embodiment includes n pixel circuits (pixel circuits 31 to 3n in FIG. 3) provided for one vertical signal line SL. Since the pixel circuits 31 to 3n are identical to each other, only the pixel circuit 31 is shown in detail in FIG. 3. The pixel circuit 31 includes an optical/electrical conversion element (e.g., a photodiode 41), a transfer transistor 42, a reset transition 43, an amplification transistor 44, and a selection transistor 45.

The photodiode 41 generates an electric charge according to the amount of light incident on the image pickup device 15. The transfer transistor 42 is an NMOS transistor and reads the electric charge from the photodiode 41. A source of the transfer transistor 42 is connected to the photodiode 41 and a drain thereof is connected to a floating diffusion FD. Further, a read control signal TX1 is supplied to a gate of the transfer transistor 42. The floating diffusion FD accumulates the electric charge read through the transfer transistor 42. The reset transition 43 is an NMOS transistor and connected between the floating diffusion FD and a power supply line PWR. A reset control signal RST1 is supplied to a gate of the reset transition 43. The reset transition 43 is an NMOS transistor. A gate of the reset transition 43 is connected to the floating diffusion FD and a drain thereof is connected to the power supply line PWR. Further, a source of the reset transition 43 is connected to an output line. Further, the amplification transistor 44 outputs pixel information Vopx having a voltage that is determined according to the amount of the electric charge accumulated in the floating diffusion FD. The selection transistor 45 is an NMOS transistor and disposed between the source of the amplification transistor 44 and the vertical signal line SL. Further, a selection signal SEL1 is supplied to a gate of the selection transistor 45.

Further, a parasitic capacitance CvsL is formed in the vertical signal line SL. This parasitic capacitance CvsL is a wiring capacitance of the vertical signal line SL. The pixel current source 22 is disposed at an end of the vertical signal line SL. The pixel current source 22 includes a fourth switch (e.g., a switch SWipx) and a constant current source 46. The switch SWipx is disposed between the constant current source 46 and the vertical signal line SL. The constant current source 46 draws a constant current from the vertical signal line SL.

The amplification circuit 23 includes an amplifier 47, a first capacity (e.g., an input capacity Ci), a second capacity (e.g., a feedback capacity Cf), a first switch (e.g., a switch SWamp), a second switch (e.g., a switch SWrcy), a third switch (e.g., a switch SWrs), and a reference voltage source.

One end of the input capacity Ci is connected to the vertical signal line SL. An inverting input terminal of the amplifier 47 is connected to the other end of the input capacity Ci and a first reference voltage (e.g., a reference voltage Vref) is supplied to a non-inverting input terminal of the amplifier 47. The reference voltage source generates the reference voltage Vref. One end of the feedback capacity Cf is connected to the inverting input terminal of the amplifier 47. The switch SWamp connects the other end of the feedback capacity Cf with an output terminal of the amplifier 47. The switch SWrcy is connected between the other end of the feedback capacity Cf and the vertical signal line SL. The switch SWrs is disposed between the inverting input terminal of the amplifier 47 and its output terminal.

The timing generator 27 controls open/close states of the switches SWamp, SWrcy and SWrc, and controls an operating state of the pixel current source 22 (e.g., an open/close state of the switch SWipx). Specifically, the timing generator 27 stops the drawing of the constant current performed by the pixel current source 22, turns off the switch SWamp, and turns on the switch SWrcy in a charge recovery period set in a period between a first timing at which the amplification of an image pickup signal read from the first pixel circuit (e.g., the pixel circuit 31) by the amplifier 47 has been completed to a second timing at which the amplification of a dark level signal read from a second pixel circuit (e.g., the pixel circuit 32) by the amplifier 47 is started. Further, the timing generator 27 makes the pixel current source 22 draw the constant current, turns on the switch SWamp, and turns off the switch SWrcy in a period before the first timing and in a period at and after the second timing. The timing generator 27 controls the switch SWrs into an on-state in the charge recovery period. The timing generator 27 turns off the switch SWipx in the charge recovery period and turns on the switch SWipx in periods other than the charge recovery period.

Figure 4:
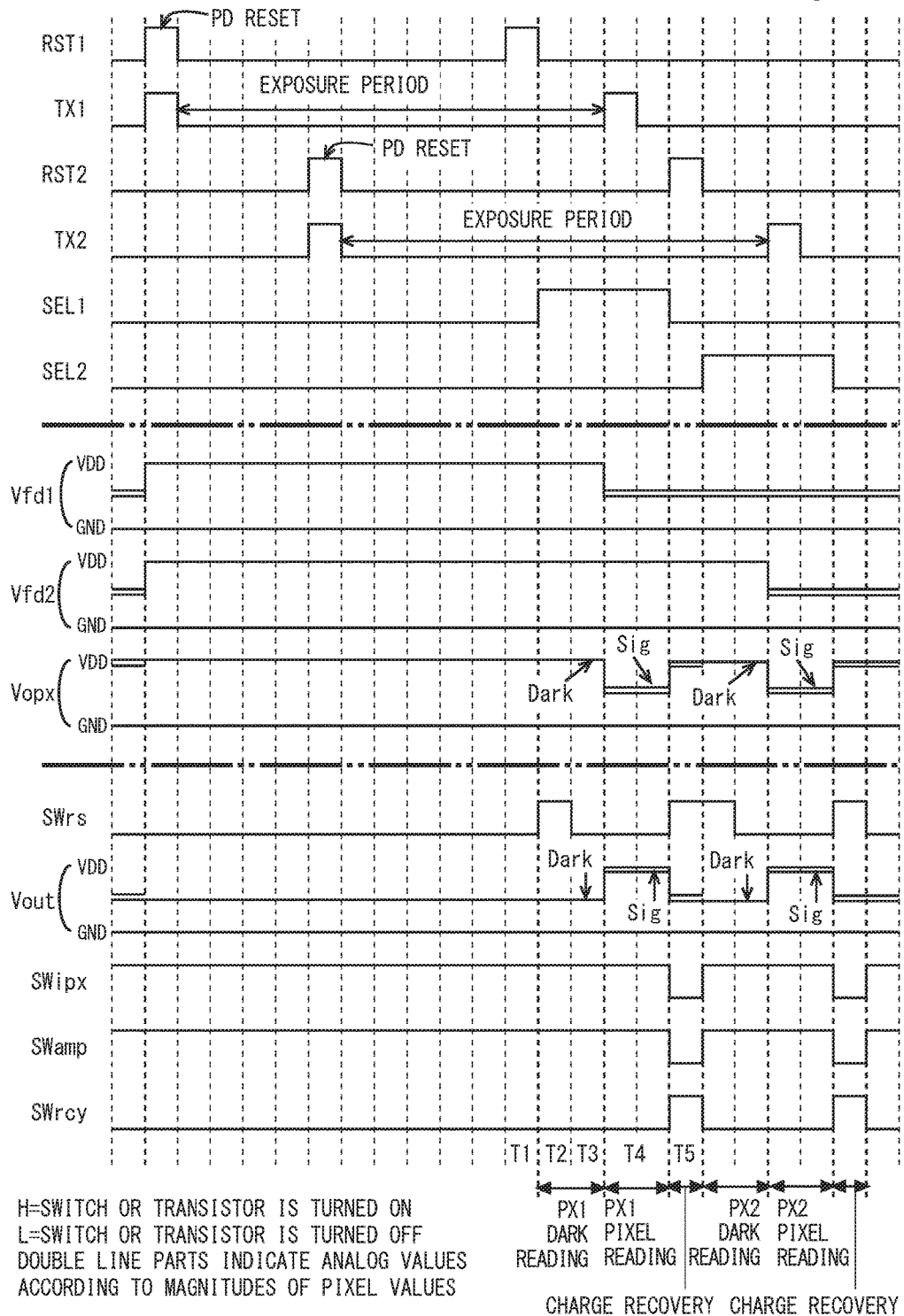
FIG. 4 is a timing chart for explaining an operation of the image pickup device according to the first embodiment.

One of the features of the image pickup device 15 according to the first embodiment lies in its control method for the amplification circuit 23 performed by the timing generator 27 when pixel information is read. Accordingly, an operation of the image pickup device 15 according to the first embodiment is explained hereinafter with particular emphasis on the control method for the amplification circuit 23. Therefore, FIG. 4 shows a timing chart for explaining an operation of the image pickup device 15 according to the first embodiment. In the example shown in FIG. 4, a case in which pixel information is read from two pixel circus, i.e., the pixel circuits 31 and 32 is shown. However, substantially the same operation is performed when pixel information is read from n pixel circuits.

Firstly, operations of the pixel circuits 31 and 32 performed when pixel information is read from the pixel circuits 31 and 32 are explained. As shown in FIG. 4, in the image pickup device 15 according to the first embodiment, various processes including resetting (or initializing) of the photodiode 41, resetting of the floating diffusion FD, outputting of a dark level, and outputting of pixel information are performed for each pixel circuit.

In the reset process for the photodiode 41, the transfer transistor 42 and the reset transition 43 are turned on, so that the charge levels of the floating diffusion FD and the photodiode 41 are brought to the reset level. Then, an exposure process is started by changing the states of the transfer transistor 42 and the reset transistor 43 from the on-state to an off-state. Then, during the period of this exposure process (i.e., during the exposure process in the figure), the reset process for the floating diffusion FD is performed by switching the reset transition 43 to an on-state. Further, during the exposure period, after the reset process for the floating diffusion FD is completed, the image pickup device 15 outputs a dark level by switching the reset transition 43 from the on-state to an off-state and switching the selection transistor 45 from the off-state to an on-state. After that, the image pickup device 15 transfers the electric charge of the photodiode 41 to the floating diffusion FD and outputs pixel information Vopx to the vertical signal line SL by switching the transfer transistor 42 from the off-state to an on-state.

Note that the dark level is a power supply voltage level in the image pickup device 15 according to the first embodiment. Further, in the image pickup device 15 according to the first embodiment, as pixel information is read from the photodiode 41, the floating diffusion FD and the vertical signal line SL have analog voltages lower than the power supply voltage level. Note that the analog voltage corresponding to the pixel information could have various voltage values according to the magnitude of the pixel information. Therefore, in FIG. 4, parts in which signals have analog voltages are indicated by double lines.

Next, operations of the pixel current source 22 and the amplification circuit 23 performed when pixel information is read are explained. As shown in FIG. 4, before the process for reading pixel information is performed, switches are controlled so that the pixel current source 22 is controlled to a state in which it draws a current from the vertical signal line SL and the amplification circuit 23 functions as an inverting amplification circuit. The state of the switches (hereinafter referred to as a "switch state") in this period before the process for reading pixel information is explained by using a switch state in a period T1 as an example. Therefore, FIG. 5 shows a circuit diagram of the amplification circuit for explaining the switch state in the period T1 in the timing chart shown in FIG. 4.

Figure 5:
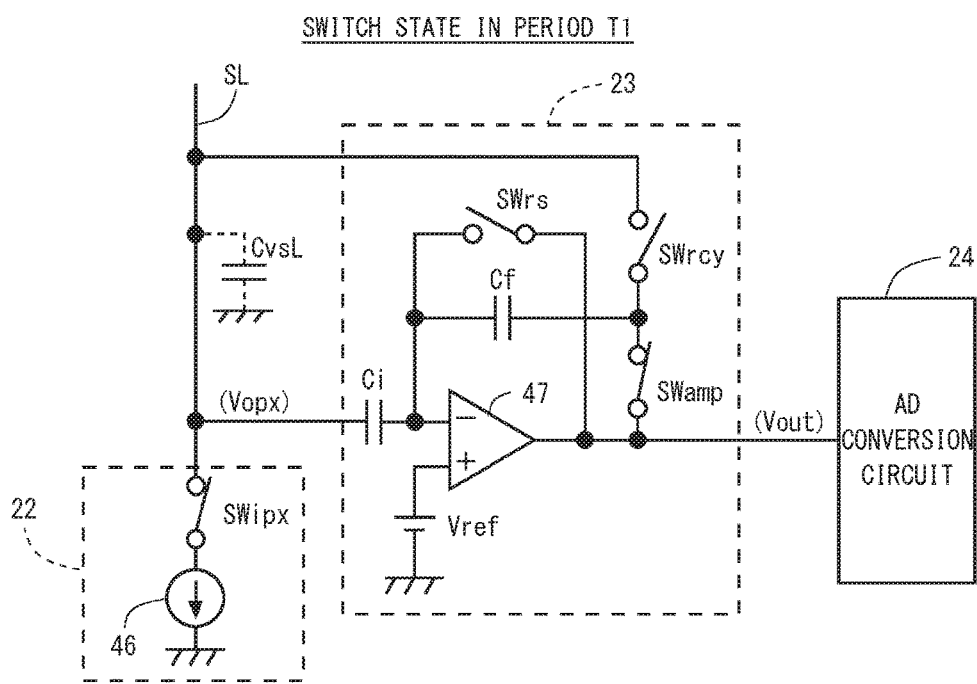
FIG. 5 is a circuit diagram of the amplification circuit for explaining a switch state in a period T1 in the timing chart shown in FIG. 4.

As shown in FIG. 5, in the period T1, the switches are controlled so that: the switch SWipx is in an on-state; the switch SWrs is in an off-state; the switch SWamp is in an on-state; and the switch SWrcy is in an off-state.

Figure 6:
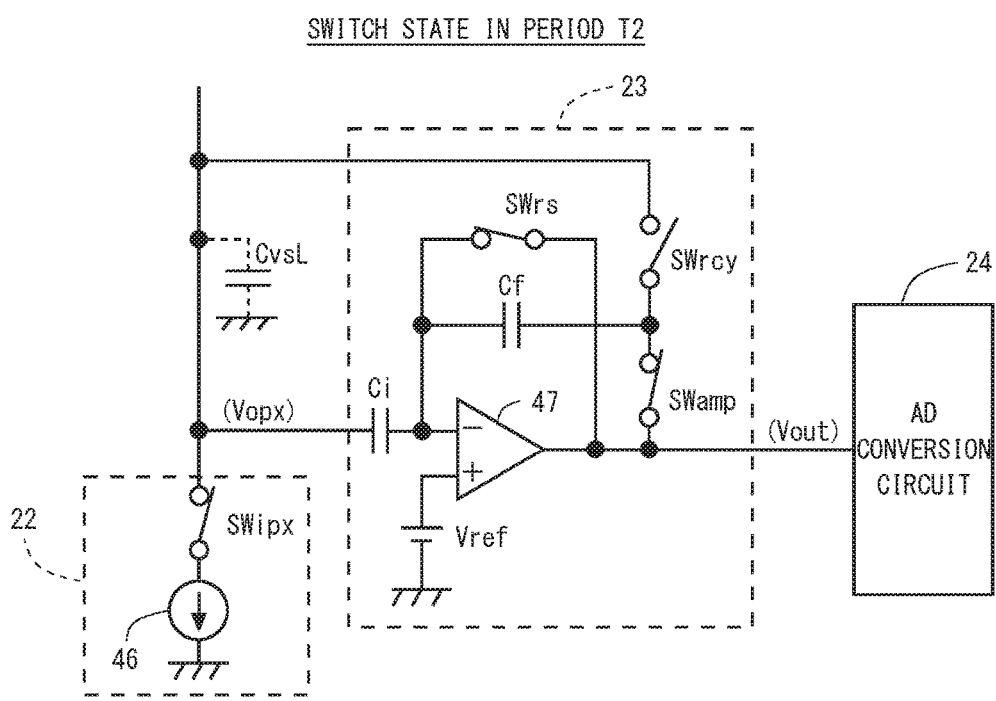
FIG. 6 is a circuit diagram of the amplification circuit for explaining a switch state in a period T2 in the timing chart shown in FIG. 4.

Next, operations of the pixel current source 22 and the amplification circuit 23 performed when a dark level is read are explained. As shown in FIG. 4, when a dark level is read, the switch state is changed from a state in a period T2 in which the feedback capacity Cf is reset to a state in a period T3 in which an operation for reading the dark level is performed. In the period T2, the switch state is controlled so that the amplification circuit 23 functions as a buffer. By doing so, the electric charge of the feedback capacity Cf is reset. In the period T3, the amplification circuit 23 is made to function as an inverting amplifier, so that pixel information Vout to be converted (hereinafter referred to as "conversion-target pixel information Vout") corresponding to the dark level transferred through the vertical signal line SL is output. Therefore, FIG. 6 shows a circuit diagram of the amplification circuit for explaining the switch state in the period T2 in the timing chart shown in FIG. 4. Further, FIG. 7 shows a circuit diagram of the amplification circuit for explaining the switch state in the period T3 in the timing chart shown in FIG. 4.

As shown in FIG. 6, in the period T2, the switches are controlled so that: the switch SWipx is in the on-state (i.e., remains in the on-state); the switch SWrs is switched from the off-state to an on-state; the switch SWamp is in the on-state; and the switch SWrcy is in the off-state.

Figure 7:
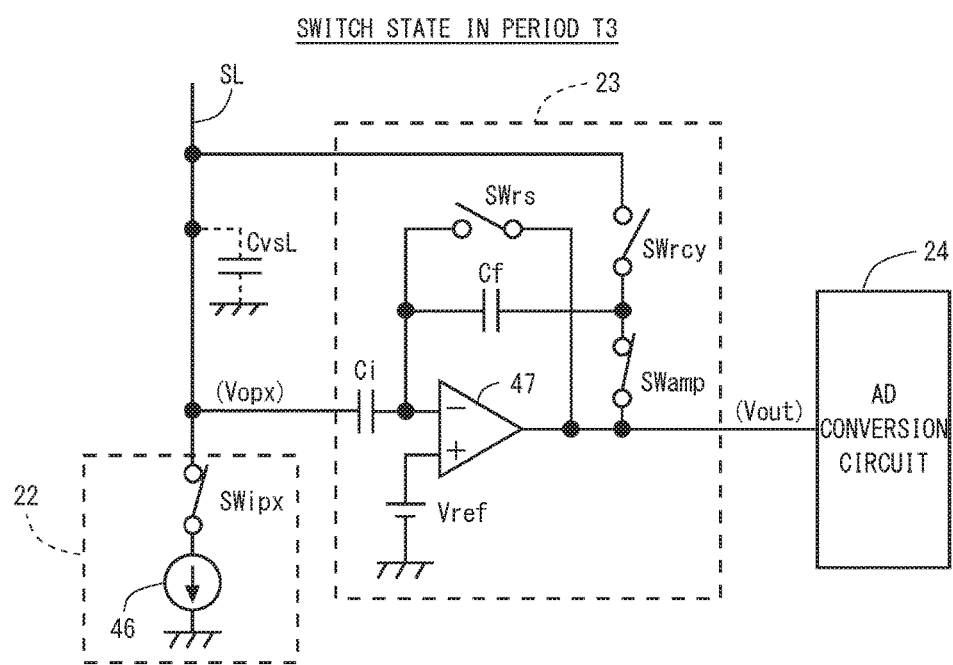
FIG. 7 is a circuit diagram of the amplification circuit for explaining a switch state in a period T3 in the timing chart shown in FIG. 4.

As shown in FIG. 7, in the period T3, the switches are controlled so that: the switch SWipx is in the on-state; the switch SWrs is switched from the on-state to an off-state; the switch SWamp is in the on-state; and the switch SWrcy is in the off-state.

Next, operations of the pixel current source 22 and the amplification circuit 23 performed when pixel information Vopx is read are explained. As shown in FIG. 4, when pixel information Vopx is read, the switch state in the period T3 is maintained, so that the pixel information Vopx output to the vertical signal line SL is converted into conversion-target pixel information Vout by the amplification circuit 23 which is configured (i.e., made to function) as the inverting amplifier. Since the switch state in the above-described process is the same as that in the period T3, its explanation is omitted.

Next, operations of the pixel current source 22 and the amplification circuit 23 in the charge recovery period in which the electric charge of the feedback capacity Cf is recovered (i.e., collected) by transferring the electric charge to the parasitic capacitance CvsL of the vertical signal line SL and the input capacity Ci are explained. As shown in FIG. 4, in a period T4 which becomes the charge recovery period, the switches are eventually controlled so that: the switch SWipx is in an off-state; the switch SWrs is in an on-state; the switch SWamp is in an off-state; and the switch SWrcy is in an on-state. In the image pickup device 15 according to the first embodiment, each of the switches is controlled through four stages and brought into the final switch state in the period T4. Therefore, the control of switches in the period T4 is explained while showing a switch state at each of the four stages.

Figure 8:
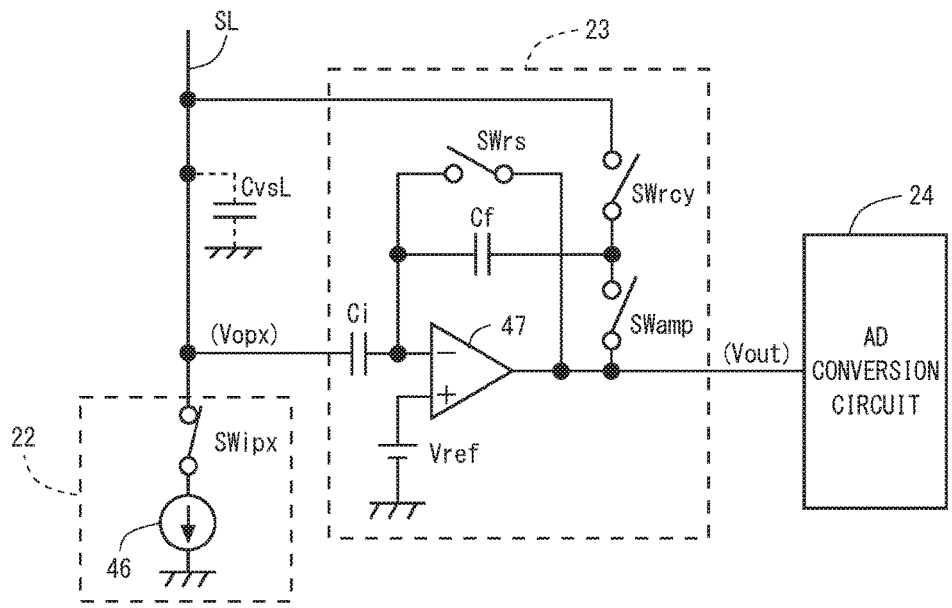
FIG. 8 is a circuit diagram of the amplification circuit for explaining a switch state after a first state change in a period T5 in the timing chart shown in FIG. 4.

FIG. 8 shows a circuit diagram of the amplification circuit for explaining a switch state after a first state change in a period T5 in the timing chart shown in FIG. 4. In this first state change, the switches are controlled so that: the switch SWipx is in an on-state; the switch SWrs is in an off-state; the switch SWamp is switched from an on-state to an off-state; and the switch SWrcy is in an off-state.

Figure 9:
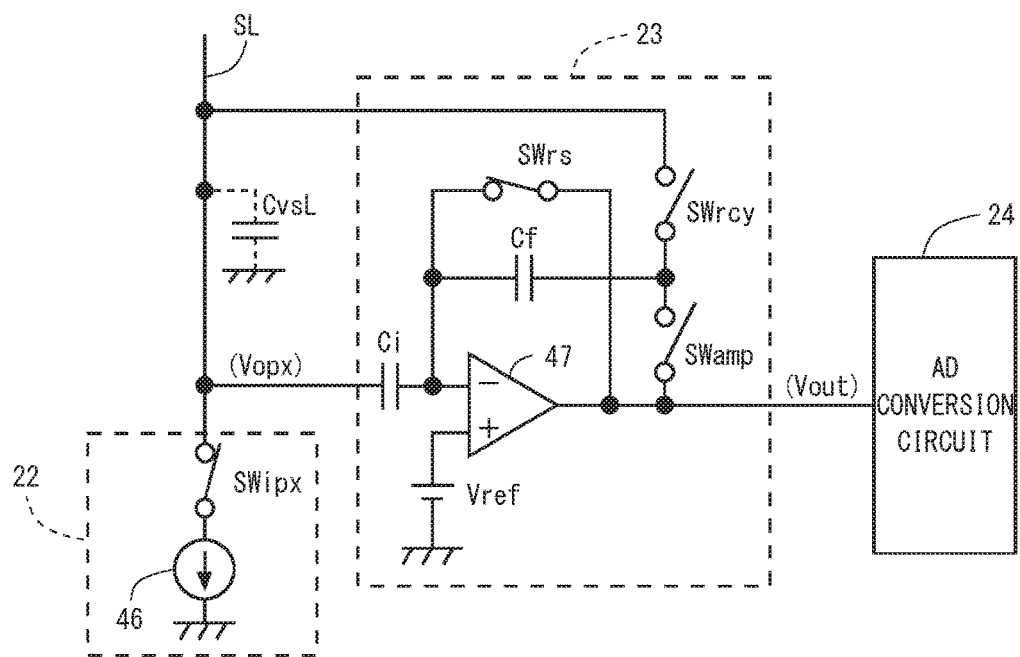
FIG. 9 is a circuit diagram of the amplification circuit for explaining a switch state after a second state change in the period T5 in the timing chart shown in FIG. 4.

FIG. 9 shows a circuit diagram of the amplification circuit for explaining a switch state after a second state change in the period T5 in the timing chart shown in FIG. 4. In this second state change, the switches are controlled so that: the switch SWipx is in the on-state; the switch SWrs is switched from the off-state to an on-state; the switch SWamp is in the off-state; and the switch SWrcy is in the off-state.

Figure 10:
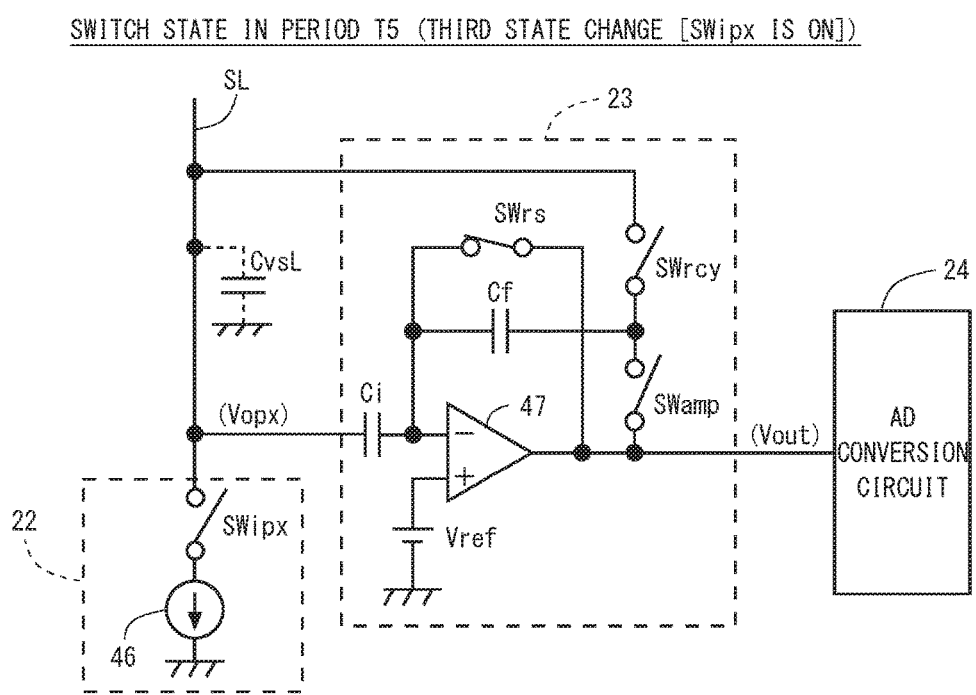
FIG. 10 is a circuit diagram of the amplification circuit for explaining a switch state after a third state change in the period T5 in the timing chart shown in FIG. 4.

FIG. 10 shows a circuit diagram of the amplification circuit for explaining a switch state after a third state change in the period T5 in the timing chart shown in FIG. 4. In this third state change, the switches are controlled so that: the switch SWipx is switched from the on-state to an off-state; the switch SWrs is in the on-state; the switch SWamp is in the off-state; and the switch SWrcy is in the off-state.

Figure 11:
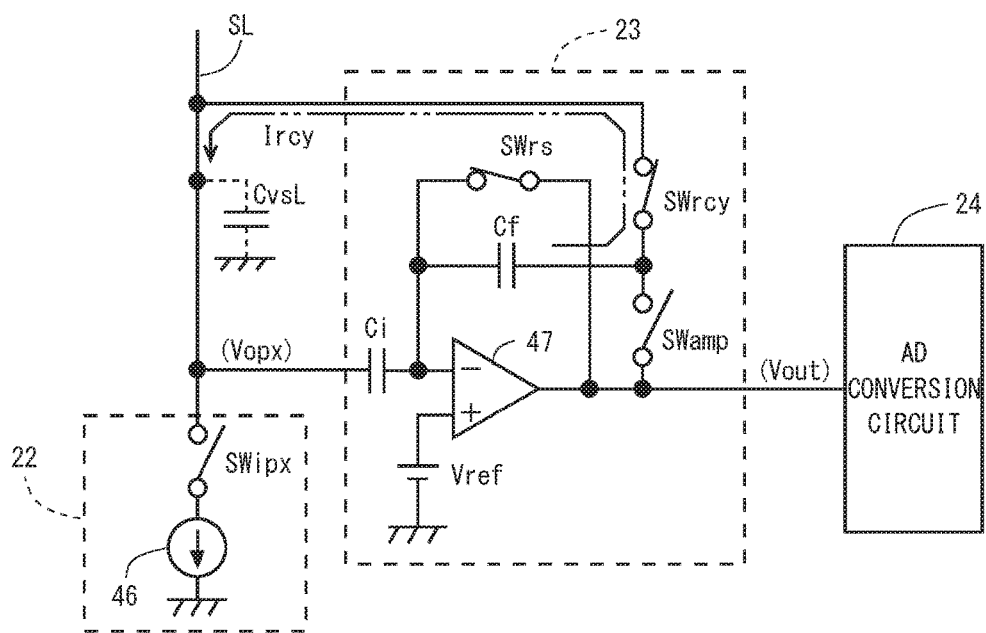
FIG. 11 is a circuit diagram of the amplification circuit for explaining a switch state after a fourth state change in the period T5 in the timing chart shown in FIG. 4.

FIG. 11 shows a circuit diagram of the amplification circuit for explaining a switch state after a fourth state change in the period T5 in the timing chart shown in FIG. 4. In this fourth state change, the switches are controlled so that: the switch SWipx is in the off-state; the switch SWrs is in the on-state; the switch SWamp is in the off-state; and the switch SWrcy is switched from the off-state to an on-state.

In the image pickup device 15, since pixel information Vopx is read by the amplification circuit 23 configured as the inverting amplifier, the voltage of the vertical signal line SL falls from the dark level due to the reading of the pixel information Vopx and the voltage of conversion-target pixel information Vout, which is the output of the amplification circuit 23, rises. Because of this, charging from the feedback capacity Cf to the parasitic capacitance CvsL and the input capacity Ci is performed in the state in which the fourth state change has been completed in the period T5.

In this way, by bringing the switch state into the final switch state through the first to fourth state changes, the image pickup device 15 prevents the amplification circuit 23 from becoming an unstable state and prevents the electric charge accumulated in the feedback capacity Cf from flowing out, thus improving charge recovery efficiency. In particular, in the amplification circuit 23, the stability of the inverting input terminal of the amplifier 47 is improved by configuring the amplifier 47 into the buffer circuit by using the switch SWrs when the electric charge is recovered. As a result, the efficiency of the charge transfer from the feedback capacity Cf to the parasitic capacitance CvsL and the input capacity Ci is improved.

Further, in the image pickup device 15 according to the first embodiment, the operations in the periods T2 to T5 are repeated for each pixel circuit.

As explained above, the image pickup device 15 according to the first embodiment transfers the electric charge accumulated in the feedback capacity Cf to the parasitic capacitance CvsL of the vertical signal line SL and the input capacity Ci in the charge recovery period set in the period between the first timing at which the amplification of an image pickup signal read from the first pixel circuit (e.g., the pixel circuit 31) by the amplifier 47 has been completed to the second timing at which the amplification of a dark level signal read from the second pixel circuit (e.g., the pixel circuit 32) by the amplifier 47 is started. As a result, the potential of the vertical signal line SL, which has fallen from the dark level due to the reading of pixel information Vopx, rises. Further, in the image pickup device 15 according to the first embodiment, the amount of electric charge with which the parasitic capacitance CvsL of the vertical signal line SL is charged when the vertical signal line SL and the input capacity Ci are brought to the dark level of the second pixel circuit, which is read subsequent to the reading of the first pixel circuit, is reduced. That is, in the image pickup device 15 according to the first embodiment, by transferring the electric charge that is accumulated in the feedback capacity Cf when pixel information Vopx is read to the parasitic capacitance CvsL and the input capacity Ci, the electric current that is used to charge the vertical signal line SL and the input capacity Ci when the dark level is read is reduced. As a result it is possible to reduce the power consumption.

In recent years, the number of pixels in an image pickup device and its frame rate are significantly increasing. As a result, the power consumption of the image pickup device is increasing. For example, assume a case where moving images having a frame rate of 120 fps are taken by an image pickup device 15 equipped with pixels arranged in a lattice pattern including 7,680 columns in the horizontal direction and 4,320 rows in the vertical direction. In this case, assuming that the parasitic capacitance CvsL of the vertical signal line for the pixels and the input capacity Ci of the inverting amplifier connected to the vertical signal line SL are both 5 pF and the output amplitude of the pixels is 1V, the electric current with which the parasitic capacitance CvsL of the vertical signal line for the pixels and the input capacity Ci of the inverting amplifier are discharged/charged becomes 40 mA (i.e., (5 pF+5 pF)×1V×7,680×4,320×120=40 mA).

Here, assume that: the feedback capacity Cf of the inverting amplifier is 5 pF; the reference voltage Vref of the non-inverting input terminal of the inverting amplifier is 1V; the dark level of the vertical signal line SL of the pixel output is 2V; the signal level of the image pickup signal is 1V; and the output amplitude is 1V. In this case, the feedback capacity Cf is also charged with an electric charge of 1V. When the above-described charge recovery is performed in this state, two thirds (i.e., $\frac{2}{3}$) of the electric charge accumulated in the feedback capacity Cf moves to the capacitance CvsL of the vertical signal line SL and the input capacity Ci of the inverting amplifier and hence the voltage of the vertical signal line SL becomes 1.33V. Therefore, one third (i.e., $\frac{1}{3}$) of the aforementioned electric charge with which the feedback capacity Cf of the inverting amplifier is charged by the charging current of 40 mA can be recycled from the feedback capacity Cf of the inverting amplifier. Further, when the power supply voltage for the pixel circuits is 3V, the power consumption can be reduced by 40 mW (3V×40 mA×$\frac{1}{3}$=40 mW). This power consumption reduction effect increases in proportion to the number of pixels and the frame rate. For example, when pixels are arranged in a lattice pattern including 15,360 columns in the horizontal direction and 8,640 rows in the vertical direction and the frame rate is 120 fps, the power consumption is reduce by 160 mW. Further, when pixels are arranged in a lattice pattern including 15,360 columns in the horizontal direction and 8,640 rows in the vertical direction and the frame rate is 240 fps, the power consumption is reduce by 320 mW. As described above, the power consumption reduction effect achieved by the charge recovery in the image pickup device 15 according to the first embodiment is very high (i.e., very effective) for the increase in the number of pixels and the rise in the frame rate.

Note that the pixel circuits of the image pickup device 15 according to the first embodiment are not limited to the circuits shown in FIG. 3. That is, other forms of circuits can be also adopted. For example, a configuration in which a plurality of photodiodes 41 are provided for one amplification transistor 44 can be used. Further, the selection transistor 45 may be omitted or its place may be changed. Therefore, FIG. 12 shows a circuit diagram of a pixel circuit 31a which is obtained by removing the selection transistor 45 from the pixel circuit 31.

Figure 12:
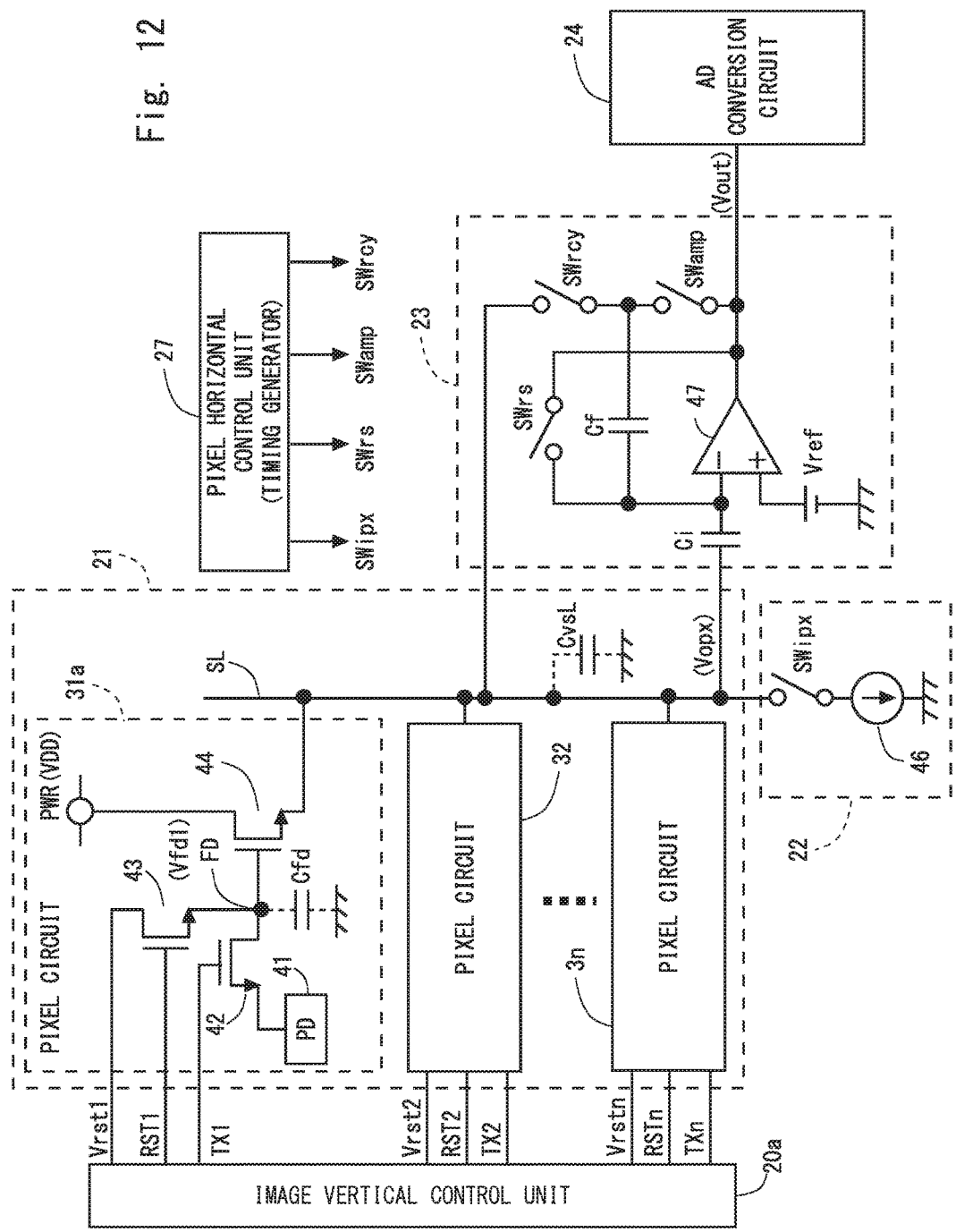
FIG. 12 is a circuit diagram for explaining a first modified example of the pixel circuits of the image pickup device according to the first embodiment.

As shown in FIG. 12, the pixel circuit 31a is obtained by removing the selection transistor 45 from the pixel circuit 31, in which a reset power supply line Vrst1 is connected to the source of the reset transition 43. In comparison to the image vertical control unit 20, an image vertical control unit 20a has an additional function of outputting a reset voltage through reset power supply lines Vrst1 to Vrstn. The image vertical control unit 20a changes the reset voltage by using the same logic as that for the selection signal SEL. This reset voltage is preferably higher than the power supply voltage VDD.

Figure 13:
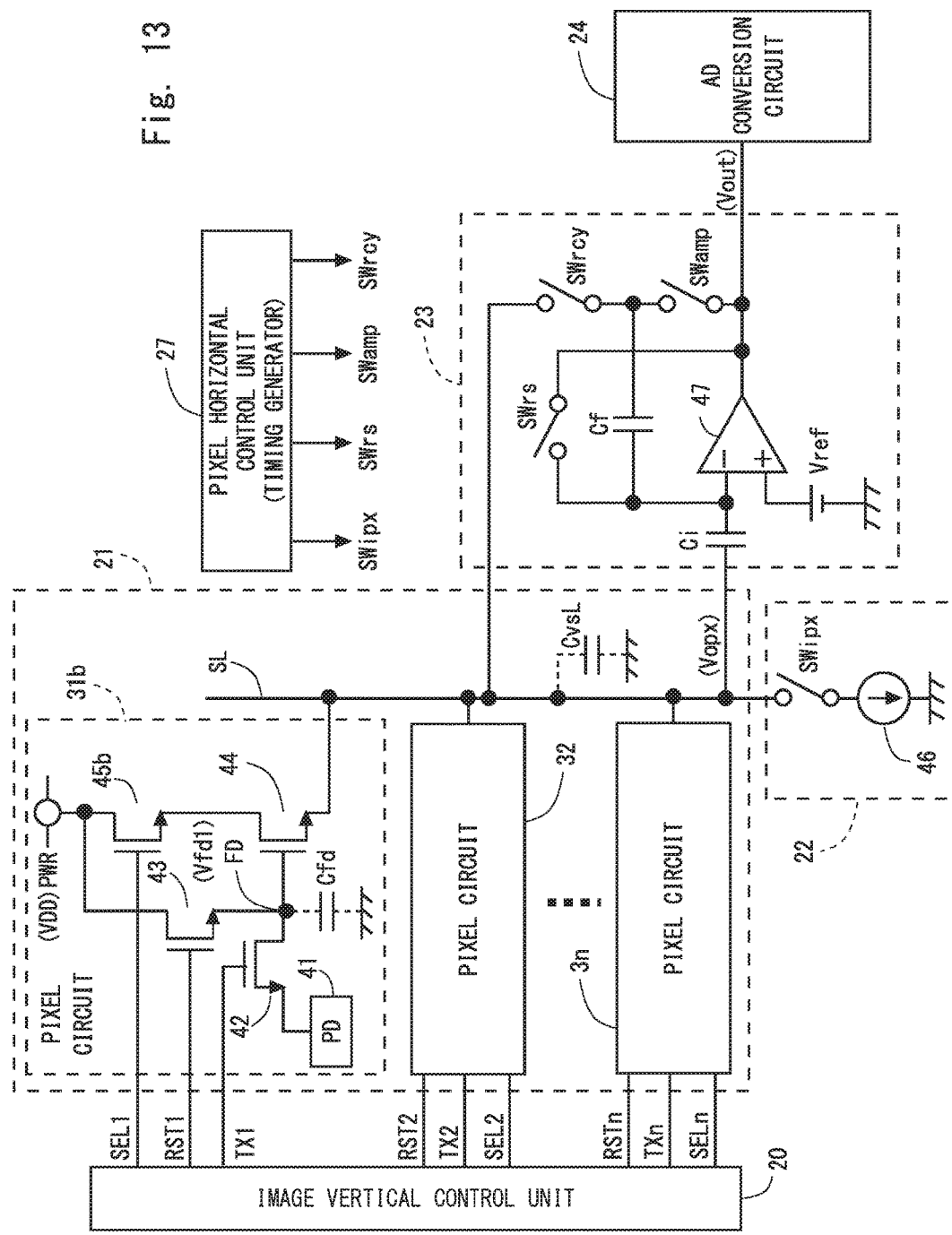
FIG. 13 is a circuit diagram for explaining a second modified example of the pixel circuits of the image pickup device according to the first embodiment.

Further, FIG. 13 shows a circuit diagram of a pixel circuit 31b that is obtained by changing the place of the selection transistor 45 in the pixel circuit 31. As shown in FIG. 13, in the pixel circuit 31b, a selection transistor 45b is disposed between the amplification transistor 44 and the power supply line PWR. This selection transistor 45b is controlled by using the selection signal SEL.

Second Embodiment

In a second embodiment, specific examples of the switch SWamp, the switch SWrs, the switch SWrcy, and the switch SWipx are explained. Note that in the explanation of the second embodiment, the same symbols as those of the first embodiment are assigned to the same components as those of the first embodiment and their explanations are omitted.

Figure 14:
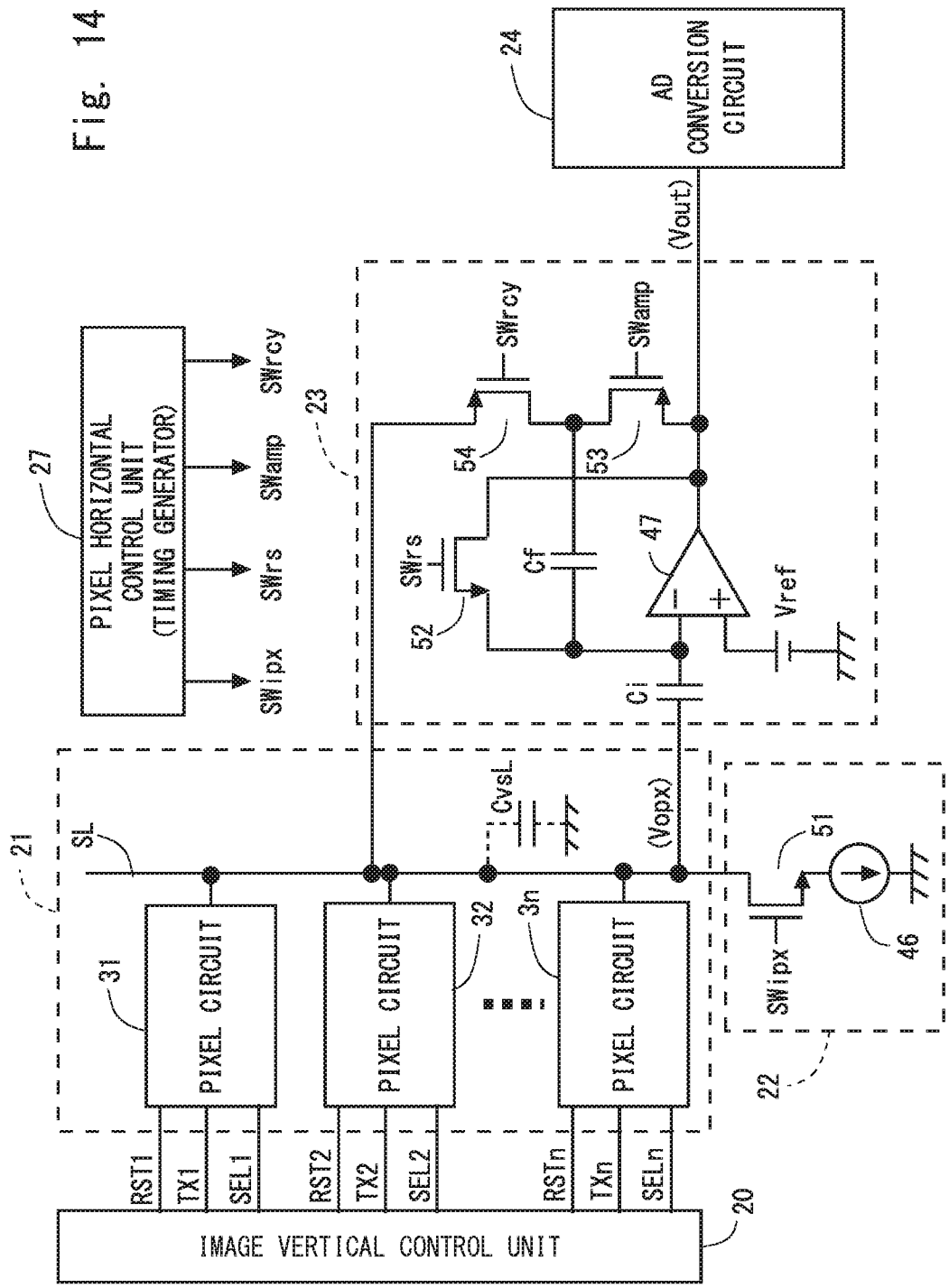
FIG. 14 is a circuit diagram of pixel circuits, a pixel current source, and an amplification circuit of an image pickup device according to a second embodiment.

FIG. 14 shows a circuit diagram of pixel circuits 31 to 3n, a pixel current source 22, and an amplification circuit 23 of an image pickup device 15 according to the second embodiment. As shown in FIG. 14, in the image pickup device 15 according to the second embodiment, an NMOS transistor 51 is used as the switch SWipx. A source of this NMOS transistor 51 is connected to the constant current source 46 and a drain thereof is connected to the vertical signal line SL. Further, a control signal for the switch SWipx is supplied to a gate of the NMOS transistor 51.

In the image pickup device 15 according to the second embodiment, an NMOS transistor 52 is used as the switch SWrs. A source of this NMOS transistor 52 is connected to the inverting input terminal of the amplifier 47 and a drain thereof is connected to the output terminal of the amplifier 47. Further, a control signal for the switch SWrs is supplied to a gate of the NMOS transistor 52.

In the image pickup device 15 according to the second embodiment, a PMOS transistor 53 is used as the switch SWamp. A source of this PMOS transistor 53 is connected to the output terminal of the amplifier 47 and a drain thereof is connected to the other end of the feedback capacity Cf. Further, a control signal for the switch SWamp is supplied to a gate of the PMOS transistor 53.

In the image pickup device 15 according to the second embodiment, a PMOS transistor 54 is used as the switch SWrcy. A source of this PMOS transistor 54 is connected to the output terminal of the vertical signal line SL and a drain thereof is connected to the other end of the feedback capacity Cf. Further, a control signal for the switch SWrcy is supplied to a gate of the PMOS transistor 54.

As shown in FIG. 14, in the image pickup device 15 according to the second embodiment, NMOS transistors and PMOS transistors are used as switches. Note that signals having the same logical levels as those in the timing chart shown in FIG. 4 may be used as control signals for the NMOS transistors. In contrast to this, signals having the opposite logical levels to those in the timing chart shown in FIG. 4 may be used as control signals for the PMOS transistors.

In the image pickup device 15 according to the second embodiment, in addition to replacing switches with transistors, the conductivity types of the transistors used as the switches are determined based on the potential relations of terminals or wiring lines connected by the switches. In this way, in the image pickup device 15 according to the second embodiment, it is possible to form each switch by using one transistor without using a transfer switch including two transistors and thereby to reduce the circuit size.

Figure 15:
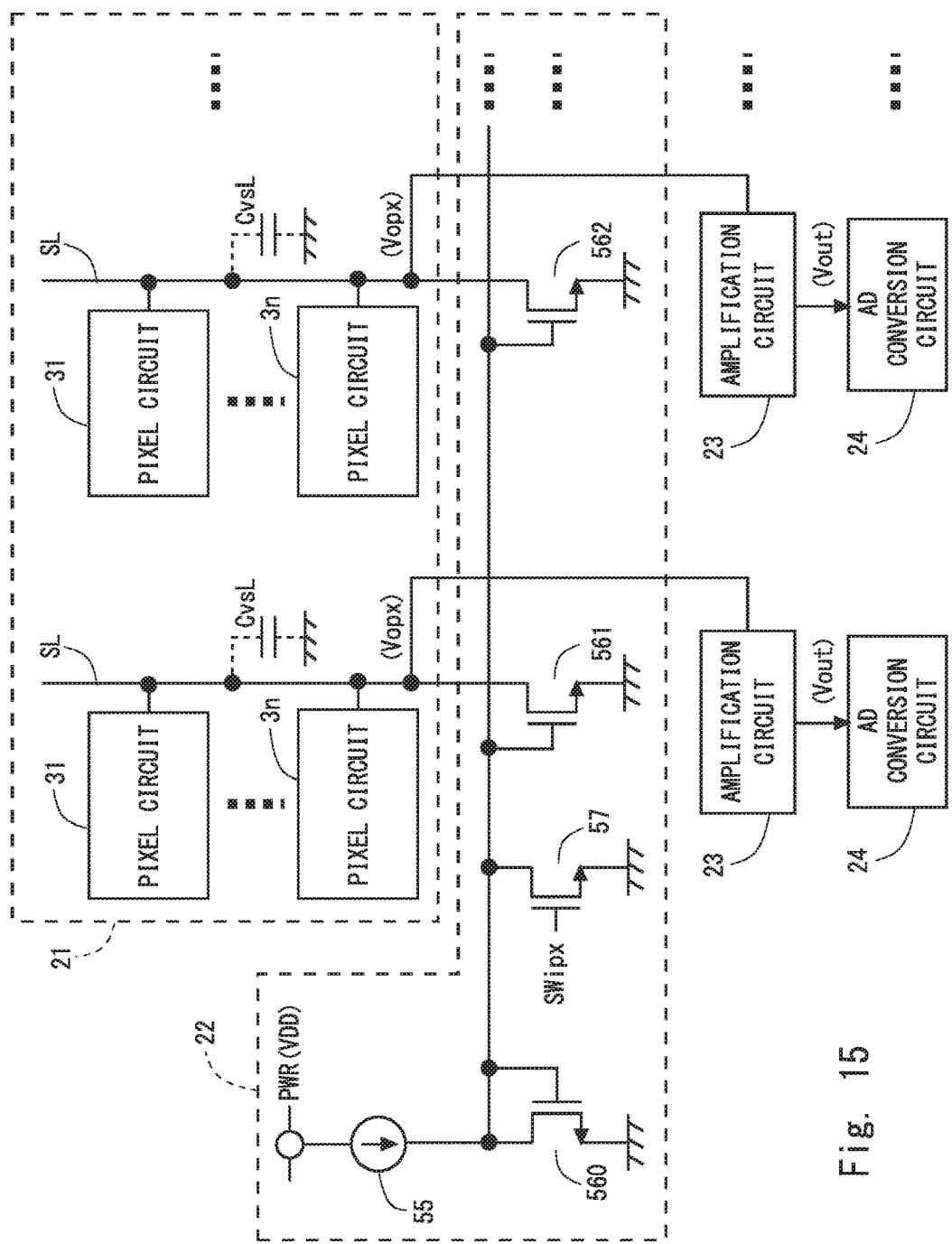
FIG. 15 is a circuit diagram for explaining another form of the pixel current source of the image pickup device according to the second embodiment.

Further, another form of a switch can be used as the switch SWipx. Therefore, FIG. 15 shows a circuit diagram for explaining another form of the pixel current source of the image pickup device according to the second embodiment. As shown in FIG. 15, in the other form, the pixel current source includes a current mirror circuit formed by NMOS transistors 560 to 562 (a part shown in the figure), a constant current source 55, and an NMOS transistor 57. The current mirror circuit outputs a constant current supplied from the constant current source 55 to a corresponding vertical signal line SL. Further, the current mirror circuit includes a gate line that connects gates of the transistors forming the current mirror circuit with each other. The NMOS transistor 57 is a transistor that serves as a fourth switch (e.g., the switch SWipx). In the example shown in FIG. 15, the drawing of the constant current from the vertical signal line SL is performed or stopped in a selective manner by switching the NMOS transistor 57 between a conductive state and a cut-off state in accordance with the operation of the switch SWipx.

In the example shown in FIG. 15, one switch SWipx is provided for a plurality of vertical signal lines SL. In this way, in the example shown in FIG. 15, the number of transistors functioning as the switches SWipx is reduced. As a result, the circuit size can be reduced.

Third Embodiment

In a third embodiment, an amplification circuit 63, which is another form of the amplification circuit 23, is explained. Note that in the explanation of the third embodiment, the same symbols as those of the first embodiment are assigned to the same components as those of the first embodiment and their explanations are omitted.

Figure 16:
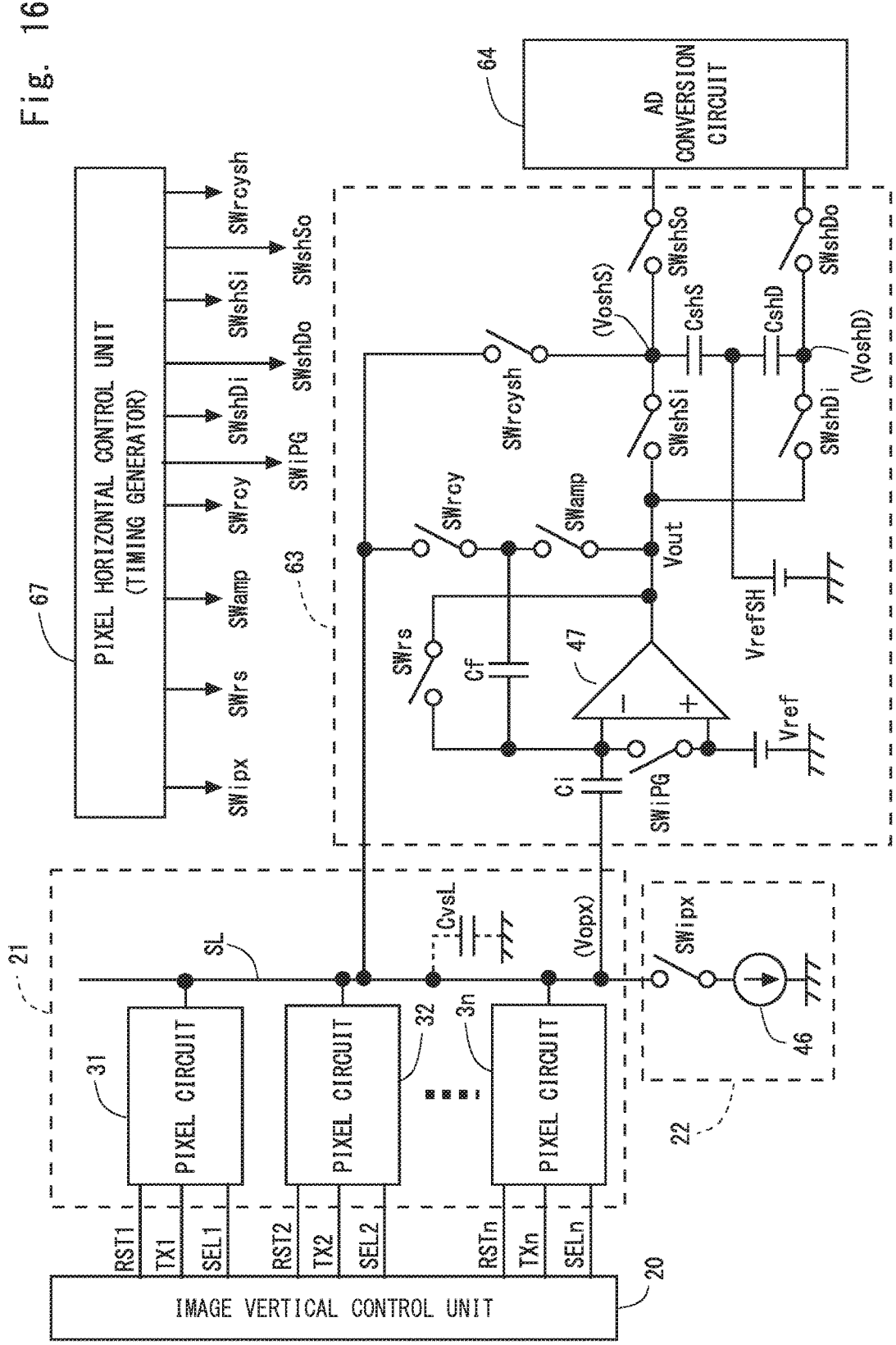
FIG. 16 is a circuit diagram of pixel circuits, a pixel current source, and an amplification circuit of an image pickup device according to a third embodiment.

FIG. 16 shows a circuit diagram of pixel circuits, a pixel current source, and an amplification circuit of an image pickup device 15 according to the third embodiment. As shown in FIG. 16, in comparison with the amplification circuit 23, the amplification circuit 63 additionally includes a fifth switch (e.g., a switch SWshDi), a sixth switch (e.g., a switch SWshSi), a seventh switch (e.g., a switch SWshDo), an eighth switch (e.g., a switch SWshSo), a ninth switch (e.g., a switch SWrcysh), a tenth switch (e.g., a switch SWiPG), a third capacitor (e.g., a capacitor CshD), and a fourth capacitor (e.g., a capacitor CshS). Further, an AD conversion circuit 64 is substantially the same as the AD conversion circuit 24, except for its conversion process timing. The image pickup device 15 according to the third embodiment samples (or captures) conversion-target pixel information Vout corresponding to a dark level as conversion-target pixel information VoshD, and then performs a conversion process of the conversion-target pixel information VoshD and a sampling process for sampling (or capturing) conversion-target pixel information Vout corresponding to pixel information Vopx as conversion-target pixel information VoshS in parallel (i.e., simultaneously performs these processes).

One end of the switch SWshDi is connected to the output terminal of the amplifier 47. One end of the switch SWshSi is connected to the output terminal of the amplifier 47. One end of the capacitor CshD is connected to the other end of the switch SWshDi and a second reference voltage (e.g., a reference voltage VrefSH) is supplied to the other end of the capacitor CshD. One end of the capacitor CshS is connected to the other end of the switch SWshSi and the second reference voltage (e.g., the reference voltage VrefSH) is supplied to the other end of the capacitor CshS. One end of the switch SWshDo is connected to the other end of the switch SWshDi and the other end thereof is connected to a circuit in the subsequent stage (i.e., a circuit connected to the output side of the amplification circuit 63) (e.g., the AD conversion circuit 64). One end of the switch SWshSo is connected to the other end of the switch SWshSi and the other end thereof is connected to the circuit in the subsequent stage (e.g., the AD conversion circuit 64). The switch SWrcysh is connected between the other end of the switch SWshSi and the other end of the vertical signal line SL. The switch SWiPG is connected between the inverting input terminal and the non-inverting input terminal of the amplifier 47.

In comparison with the timing generator 27, a timing generator 67 has an additional function of outputting control signals for controlling the switch SWshDi, the switch SWshSi, the switch SWshDo, the switch SWshSo, the switch SWrcysh, and the switch SWiPG. Further, the timing generator 67 turns on the switch SWrcysh and the switch SWiPG, and turns off the switch SWshDi, the switch SWshSi, the switch SWshDo, and the switch SWshSo in the charge recovery period.

Figure 17:
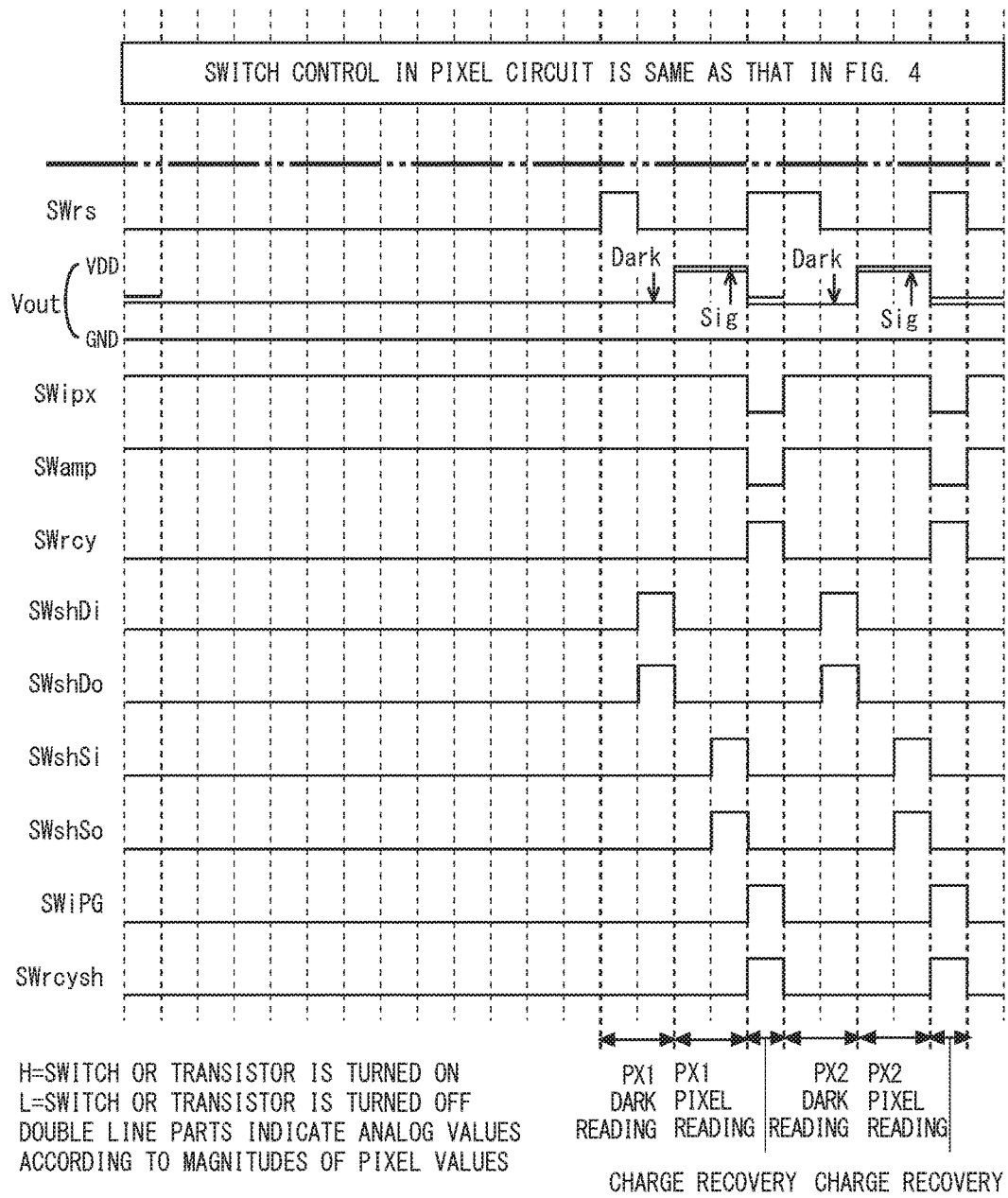
FIG. 17 is a timing chart for explaining an operation of the image pickup device according to the third embodiment.

Next, an operation of the image pickup device 15 according to the third embodiment is explained. Therefore, FIG. 17 shows a timing chart for explaining an operation of the image pickup device 15 according to the third embodiment. As shown in FIG. 17, in the image pickup device 15 according to the third embodiment, operations of the pixel circuits 31 and 32 are the same as those in the first embodiment shown in FIG. 4.

Further, when the image pickup device 15 according to the third embodiment performs an amplification process for a dark level, the image pickup device 15 turns on the switches SWshDi and SWshDo and thereby samples conversion-target pixel information Vout corresponding to the dark level into the capacitor CshD as conversion-target pixel information VoshD. Further, when the image pickup device 15 according to the third embodiment performs an amplification process for pixel information Vopx, the image pickup device 15 turns on the switches SWshSi and SWshSo and thereby samples conversion-target pixel information Vout corresponding to the pixel information Vopx into the capacitor CshS as conversion-target pixel information VoshS.

Further, the image pickup device 15 according to the third embodiment turns off the switch SWshDi, the switch SWshDo, the switch SWshSi, and the switch SWshSo, and turns on the switch SWrcysh and the switch SWiPG in the charge recovery period. By doing so, the image pickup device 15 according to the third embodiment transfers electric charges accumulated in the feedback capacity Cf and the capacitor CshS to the parasitic capacitance CvsL and the input capacity Ci.

As explained above, the image pickup device 15 according to the third embodiment separately samples the dark level voltage and the pixel information Vopx and performs the conversion process and the sampling process in parallel (i.e., simultaneously performs these processes), thus making it possible to increase the operating speed. Further, the image pickup device 15 according to the third embodiment recovers the electric charge accumulated in the capacitor CshS, into which the pixel information Vopx is sampled, into parasitic capacitance CvsL and the input capacity Ci. In this way, the image pickup device 15 according to the third embodiment can recover a larger amount of electric charge than that of the image pickup device 15 according to the first embodiment.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first to third embodiments can be combined as desirable by one of ordinary skill in the art.

Further, for example, the semiconductor device according to the above-described embodiment may have a configuration in which the conductivity type (p-type or n-type) of the semiconductor substrate, the semiconductor layer, the diffusion layer (diffusion region), and so on may be reversed. Therefore, when one of the n-type and p-type is defined as a first conductivity type and the other is defined as a second conductivity type, the first and second conductivity types may be the p-type and n-type, respectively. Alternatively, the first and second conductivity types may be the n-type and p-type, respectively.

What is claimed is:

1. An image pickup device comprising:
   a vertical signal line;
   a first pixel circuit and a second pixel circuit connected to the vertical signal line;
   a pixel current source configured to draw a constant current from the vertical signal line;
   a first capacitor, one end of the first capacitor being connected to the vertical signal line;
   an amplifier, an inverting input terminal of the amplifier being connected to another end of the first capacitor, a first reference voltage being supplied to a non-inverting input terminal of the amplifier;
   a second capacitor, one end of the second capacitor being connected to the inverting input terminal of the amplifier;
   a first switch configured to connect another end of the second capacitor with an output terminal of the amplifier;
   a second switch connected between the another end of the second capacitor and the vertical signal line; and
   a pixel horizontal control unit configured to control open/close states of the first and second switches and an operating state of the pixel current source, wherein the pixel horizontal control unit stops the drawing of the constant current performed by the pixel current source, turns off the first switch, and turns on the second switch in a charge recovery period set in a period between a first timing and a second timing, the first timing being a timing when amplification of an image pickup signal read from the first pixel circuit by the amplifier has been completed, the second timing being a timing when amplification of a dark level signal read from the second pixel circuit by the amplifier is started.

2. The image pickup device according to claim 1, wherein the pixel horizontal control unit makes the pixel current source draw the constant current, turns on the first switch, and turns off the second switch in a period before the first timing and in a period at and after the second timing.

3. The image pickup device according to claim 1, further comprising a third switch disposed between the inverting input terminal of the amplifier and the output terminal of the amplifier, wherein
   the pixel horizontal control unit controls the third switch into an on-state in the charge recovery period.

4. The image pickup device according to claim 3, wherein the pixel current source comprises:
   a constant current source configured to output the constant current; and
   a fourth switch disposed between the constant current source and the vertical signal line, and
   the pixel horizontal control unit turns off the fourth switch in the charge recovery period and turns on the fourth switch in a period other than the charge recovery period.

5. The image pickup device according to claim 4, wherein the pixel horizontal control unit:
   starts an operation by bringing the first and fourth switches into an on-state and bringing the second and third switches into an off-state in the charge recovery period;
   performs a first switch switching operation for switching the first switch from the on-state to an off-state;

performs, after the first switch switching operation, a second switch switching operation for switching the third switch from the off-state to an on-state;

performs, after the second switch switching operation, a third switch switching operation for switching the fourth switch from the on-state to an off-state; and performs, after the third switch switching operation, a fourth switch switching operation for switching the second switch from the off-state to an on-state.

6. The image pickup device according to claim 3, wherein the pixel current source comprises:

a current mirror circuit configured to output the constant current supplied from the constant current source to a corresponding vertical signal line; and a fourth switch disposed between a gate line and a ground line, the gate line connecting gates of transistors forming the current mirror circuit with each other, and the pixel horizontal control unit turns off the fourth switch in the charge recovery period and turns on the fourth switch in a period other than the charge recovery period.

7. The image pickup device according to claim 6, wherein the pixel horizontal control unit:

starts an operation by bringing the first and fourth switches into an on-state and bringing the second and third switches into an off-state in the charge recovery period;

performs a first switch switching operation for switching the first switch from the on-state to an off-state;

performs, after the first switch switching operation, a second switch switching operation for switching the third switch from the off-state to an on-state;

performs, after the second switch switching operation, a third switch switching operation for switching the second switch from the on-state to an off-state; and performs, after the third switch switching operation, a fourth switch switching operation for switching the fourth switch from the off-state to an on-state.

8. The image pickup device according to claim 1, further comprising:

a fifth switch and a sixth switch, one end of each of the fifth and sixth switches being connected to the output terminal of the amplifier;

a third capacitor, one end of the third capacitor being connected to another end of the fifth switch, a second reference voltage being supplied to another end of the third capacitor;

a fourth capacitor, one end of the fourth capacitor being connected to another end of the sixth switch, the second reference voltage being supplied to another end of the fourth capacitor;

a seventh switch, one end of the seventh switch being connected to the another end of the fifth switch, another end of the seventh switch being connected to a circuit in a subsequent stage;

an eighth switch, one end of the eighth switch being connected to the another end of the sixth switch, another end of the eighth switch being connected to the circuit in the subsequent stage;

a ninth switch connected between the another end of the sixth switch and the vertical signal line; and a tenth switch connected between the inverting input terminal and the non-inverting input terminal of the amplifier.

9. The image pickup device according to claim 8, wherein the pixel horizontal control unit turns on the ninth and tenth switches and turns off the fifth to eighth switches in the charge recovery period.

* * * * *